(12) United States Patent (10) Patent No.: US 6,590,731 B1
Pan et al. (45) Date of Patent: Jul. 8, 2003

(54) SYSTEM AND METHOD FOR ADAPTIVE SOFT HEAD LOADING OF DISK DRIVE HEAD ONTO DISK MEDIUM

(75) Inventors: Weimin Pan, North Layton, UT (US); Allen T. Bracken, Layton, UT (US); John A. Christiansen, Riverdale, UT (US); Kelly D. Wright, Layton, UT (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/444,949

(22) Filed: Nov. 22, 1999

Related U.S. Application Data

(60) Provisional application No. 60/111,935, filed on Dec. 11, 1998.

(51) Int. Cl.⁷ ............................................. G11B 21/12
(52) U.S. Cl. ......................................................... 360/75
(58) Field of Search ............................... 360/75, 78.04, 360/78.14; 318/561, 632, 638

(56) References Cited

U.S. PATENT DOCUMENTS

| 5,315,455 A | * | 5/1994 | Ito ................................. 360/75 |
| 5,455,723 A | * | 10/1995 | Boutaghou et al. ............ 360/75 |
| 5,485,323 A | * | 1/1996 | Anderson et al. ......... 360/78.08 |
| 5,633,767 A | * | 5/1997 | Boutaghou et al. ............ 360/53 |
| 5,663,846 A | * | 9/1997 | Matsuoka et al. ............. 360/75 |
| 5,666,236 A | * | 9/1997 | Bracken et al. ................ 360/75 |
| 5,920,445 A | * | 7/1999 | Angellotti et al. ........... 360/106 |
| 5,949,608 A | * | 9/1999 | Hunter ..................... 360/78.09 |
| 6,054,833 A | * | 4/2000 | Takeuchi .............. 360/78.07 X |
| 6,212,027 B1 | * | 4/2001 | Lee et al. ................. 360/78.14 |
| 6,222,696 B1 | * | 4/2001 | Kim ............................. 360/75 |
| 6,320,717 B1 | * | 11/2001 | Feng ............................ 360/75 |

FOREIGN PATENT DOCUMENTS

| WO | WO 96/12274 | 4/1996 |

* cited by examiner

*Primary Examiner*—David Hudspeth
*Assistant Examiner*—James L Habermehl
(74) *Attorney, Agent, or Firm*—Woodcock Washburn LLP

(57) ABSTRACT

A head loading apparatus and method for a disk drive device adapts the head load characteristics of a disk drive in order to minimize the velocity of the heads during loading of the heads onto the surface of a data storage medium. The apparatus is characterized by attempting to load the heads onto engagement with a medium, determining whether the heads actually load, measuring the head load velocity, and adjusting the load characteristics of the drive based on the measured head load velocity. Preferably, the pulse width of the loading current applied to the actuator of the drive is adaptive, either increasingly or decreasingly, in response to the measured head load velocity. This adaptive soft head load characteristic of the drive allows the head load velocity to be minimizes to a velocity sufficient to move the read-write heads off of a load ramp and onto the surface of a data storage medium without damaging the head, the medium, or both.

42 Claims, 13 Drawing Sheets

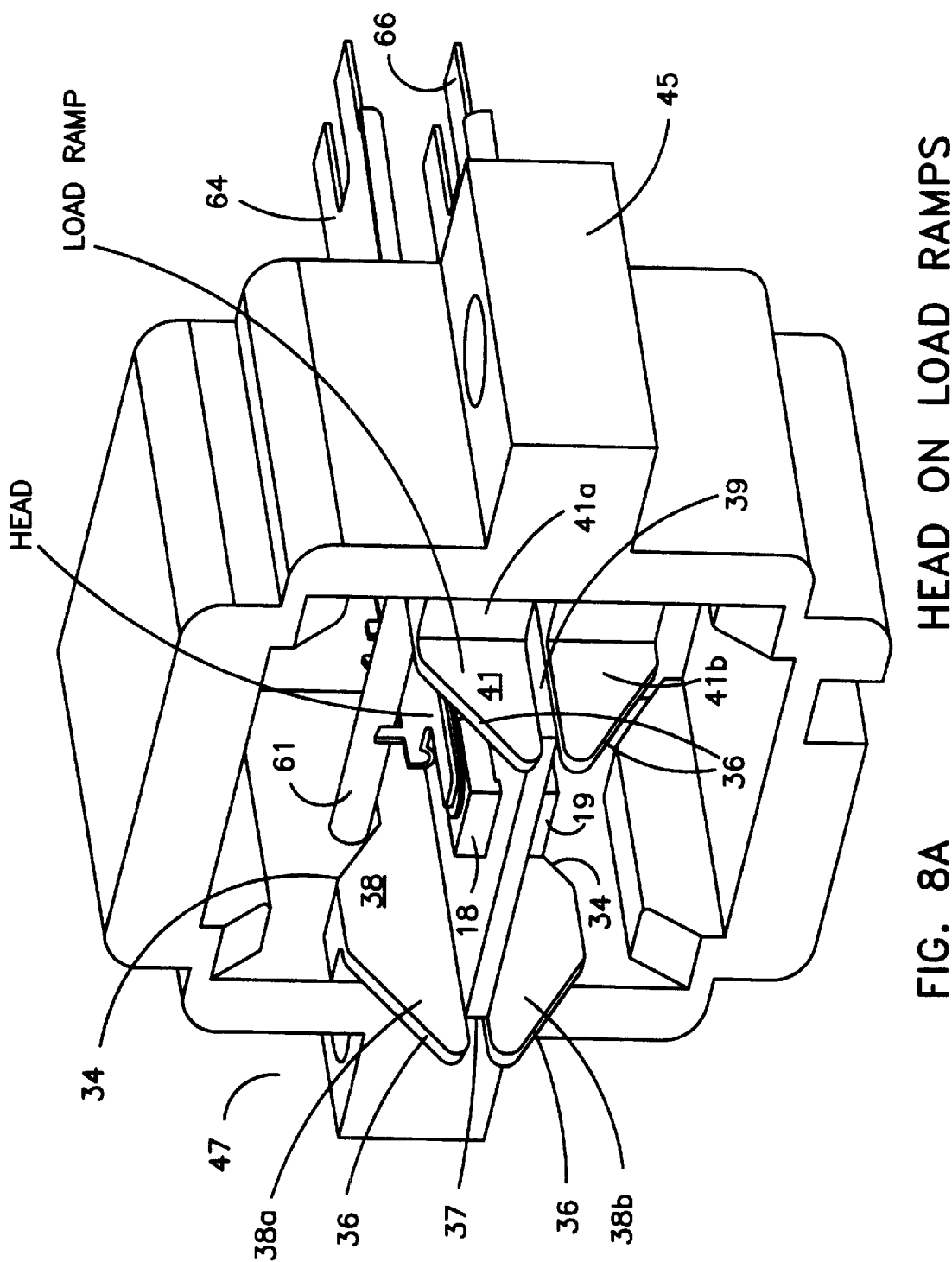
FIG. 8A    HEAD ON LOAD RAMPS

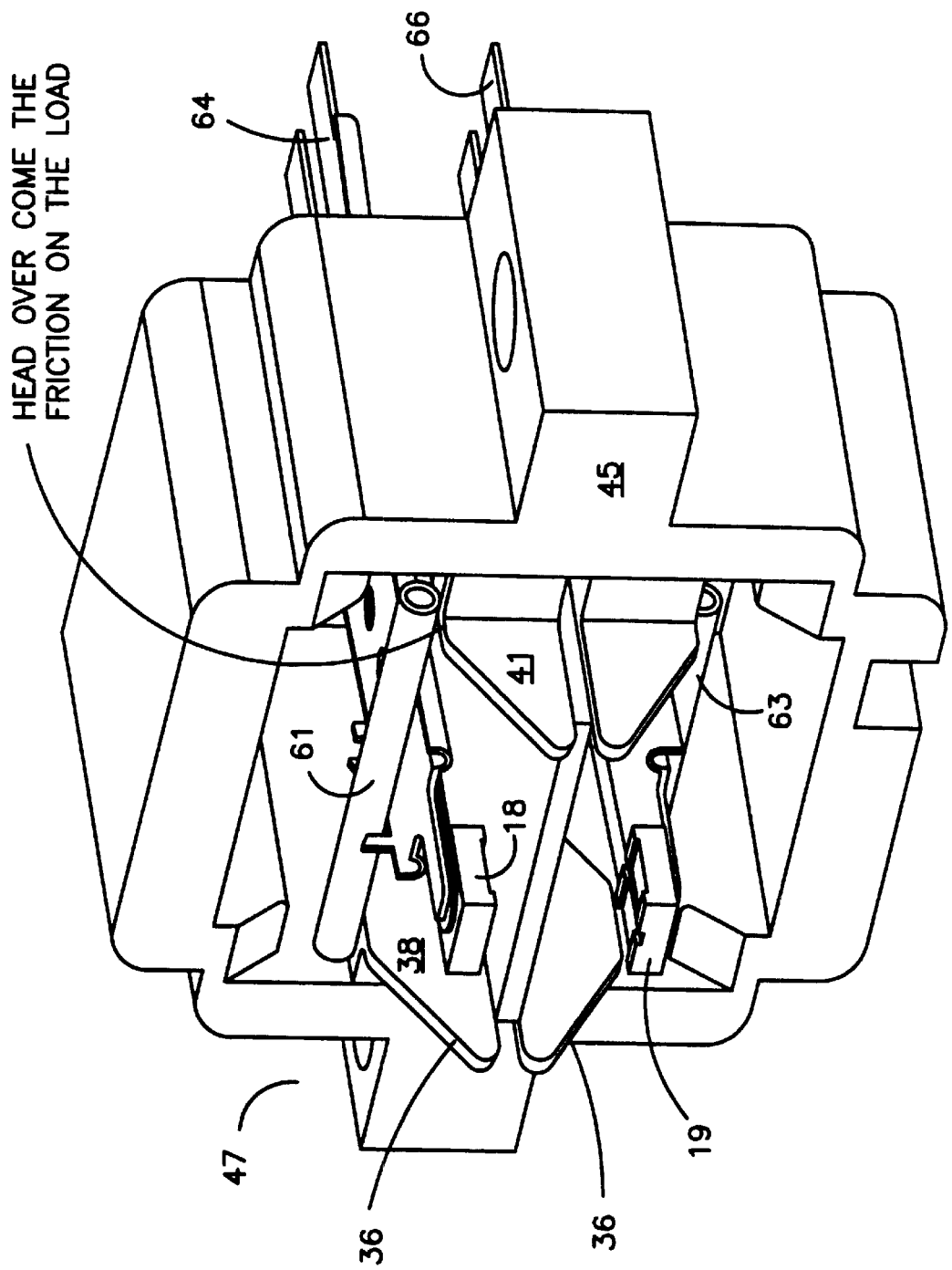
FIG. 8B  HEAD HALFWAY LOADED

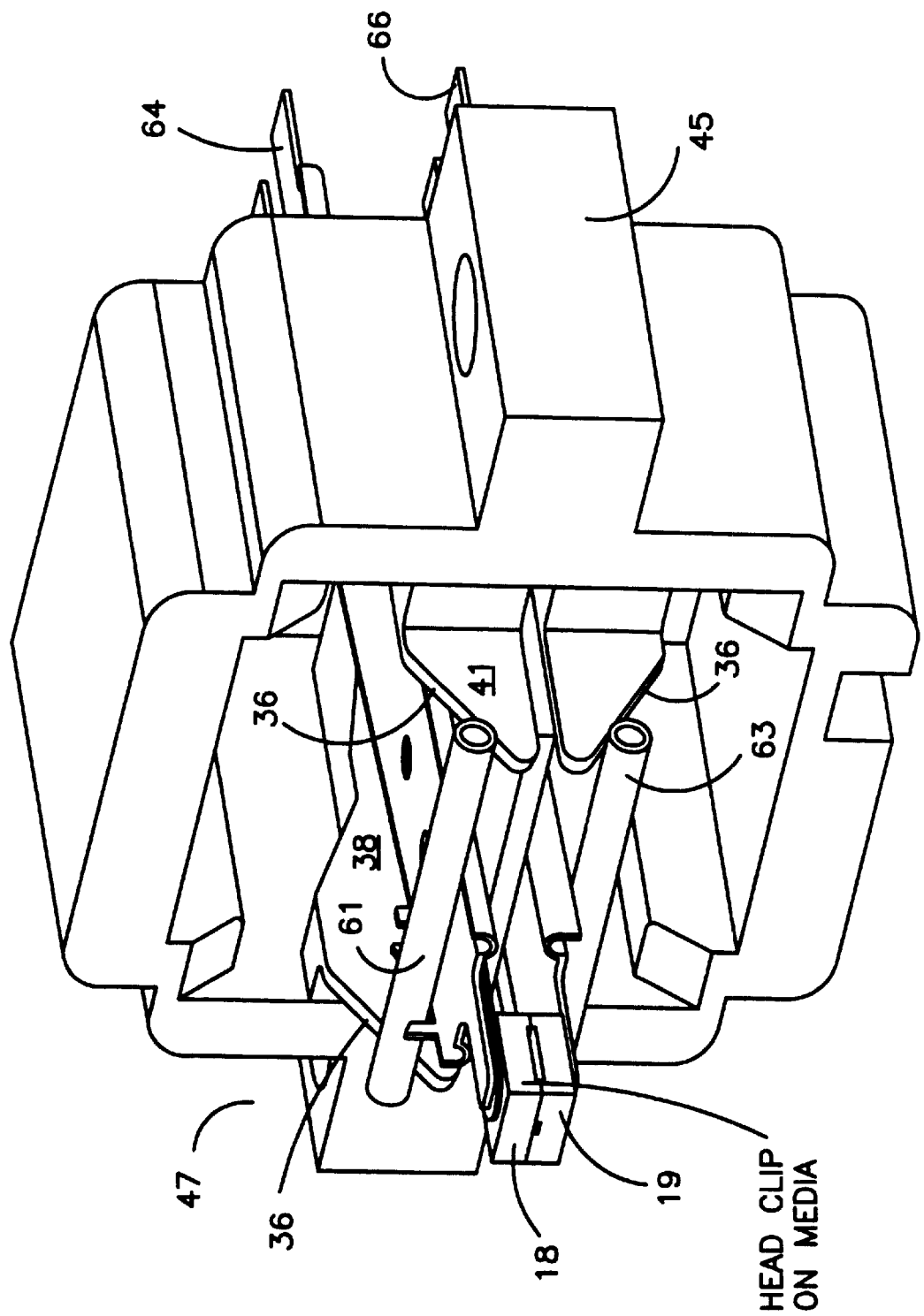
FIG. 8C  HEAD LOADED ON MEDIA

HEAD LOADING WAVEFORM

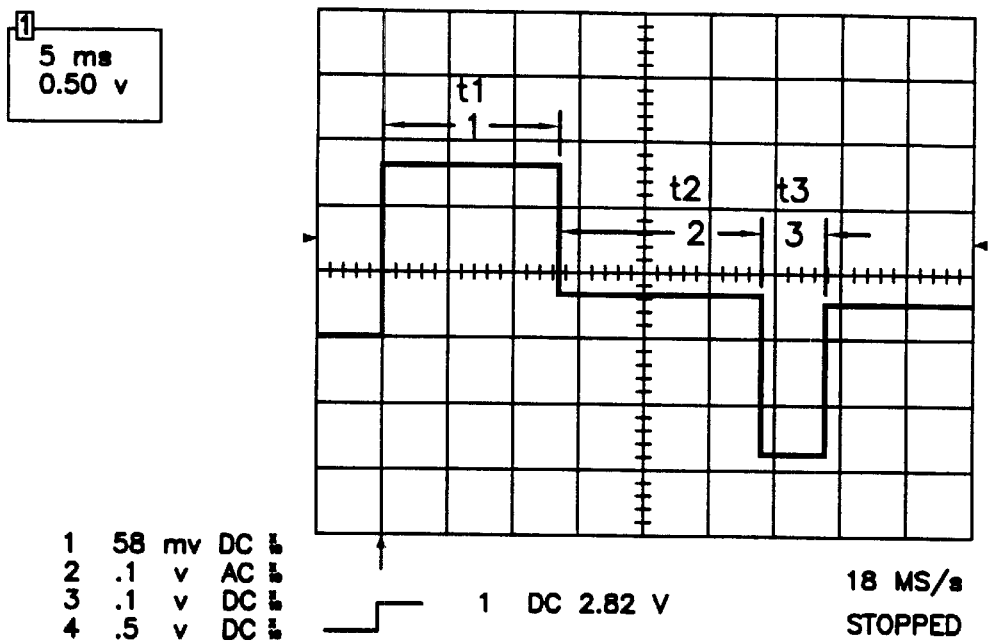

FIG. 11A

1. Time during which current to actuator is positive to load the heads. This is the time that can be adjusted by the algorithm.
2. No current is output to the actuator. This is the coast time. This portion lasts until the drive detects that the heads have successfully come onto the media up to a maximum time allowed.
3. Braking current is output to the actuator. This portion lasts until the heads have been brought to zero velocity.

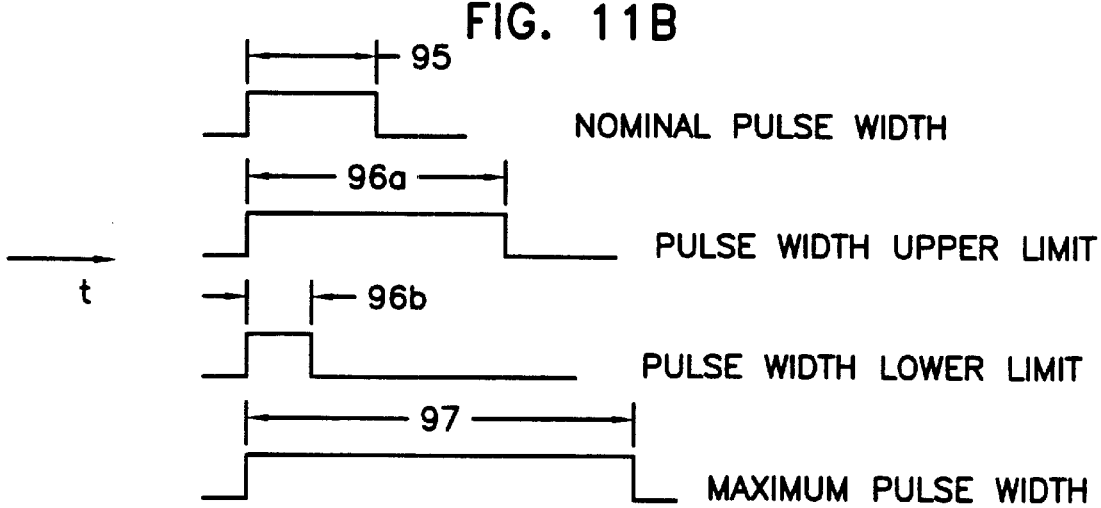

FIG. 11B

SYSTEM AND METHOD FOR ADAPTIVE SOFT HEAD LOADING OF DISK DRIVE HEAD ONTO DISK MEDIUM

This application claims the benefit of Provisional Application Ser. No. 60/111,935 filed Dec. 11, 1998.

FIELD OF THE INVENTION

This invention is directed to a disk drive device; more specifically, it is directed to a device for loading disk drive read-write heads onto a medium.

BACKGROUND OF THE INVENTION

Over many years, a variety of devices that read and write information on a rotating disk medium have been developed and used as computer data storage devices. Of these devices, magnetic medium devices have been, and still are among, the most common computer storage devices. Widely used magnetic disk drive devices are generally available in two broad categories-removable and fixed. In particular, removable cartridge disk drives read and write information magnetically on a disk that is enclosed in a removable protective case. By contrast, fixed disk drives read and write information magnetically on a fixed disk that is permanently fixed in the data storage device.

Fixed disk drives are used as the principal data storage devices of computers, since they typically have data transmission speeds and storage capacities that are several orders of magnitude greater than removable disk drives. Fixed disk drives have the drawback, as compared with removable disk drives, in that the disk cannot be easily moved to another computer. As a result, it is ordinarily desirable to provide computers with both a removable disk drive along with a fixed disk drive, and most desktop computers have both.

In recent years, however, mobile computers of very small sizes, such as hand held, notebook and lap-top computers, have become widely used. Because space in these computers is a premium, removable cartridge disk drives are attached externally or not at all. Furthermore, in such small computers, external removable cartridge drives are very inconvenient for mobile use. Hence, many of these types of computers do not have disk drives, but rather use IC card based storage media via a PCMCIA port on the computer. However, since IC cards use semiconductor memories, storage capacities are small, and costs are high. These drawbacks have made it difficult for such computers to use programs and data that have large storage requirements.

In response to the widespread use of small size mobile computers, smaller disk drives have been, and are, under development. Such drives present many development challenges including size and power constraints. The storage density is high and the components are smaller and potentially more delicate making them susceptible to damage. Moreover, small portable drives are likely to be battery powered and may share that battery power with a primary device such as a hand held computer.

Loading the head onto the surface of the data storage medium is a critical part of the design of magnetic storage medium. In order to ensure successful loading of the head onto the medium, a relatively high voltage and current is typically used. The duration and value of this current is typically set at a high value to ensure successful head loading for all drive systems. Each drive typically has it own drive characteristics, such as friction and stiction forces of the actuator arm in contact with the load ramp, that must be overcome by the drive head load characteristics in loading the head. A drive having set drive head load characteristics result in some instances in the heads failing to load onto the medium because the set head load characteristics of the drive are not sufficient to overcome the drive characteristics. More importantly, the set head loading characteristics, such as voltage and current, result in other instances where the heads load onto the medium with an excessive head load velocity. These excessive head load velocities cause damage to the head, the medium, or both.

Typically, the heads and the medium surface in magnetic storage devices are highly susceptible to damage. For example, small amounts of debris have been known to render drives and medium useless. Similarly, loading the heads onto the medium surface has the potential to damage the heads, the medium, or both. Moreover, loading the heads in small, high capacity device must also meet power and size constraints without causing damage to the drive or storage medium.

Therefore, there is a need to provide a head loading apparatus and method that may adapt to the load characteristics of each disk drive device. Particularly, a disk drive device that is small and portable.

SUMMARY OF THE INVENTION

In order to meet the aforementioned need, this invention provides a head loading apparatus for a disk drive device that reads data from and writes data to a magnetic medium. The head loading apparatus comprises an actuator movably disposed within the disk drive and a read-write head in mechanical communication with the actuator. The actuator moves the read-write head in response to an electrical signal. The head loading apparatus also comprises a head load ramp for loading and unloading of the read-write head between the disk medium and a parked position off of the medium and means in electrical communication with the actuator for moving the heads from the parked position to the medium by applying an electrical signal. The signal is adaptive in an increasing and decreasing manner in response to a measured head load velocity, such that the heads move off of the load ramps toward the medium at a minimal velocity.

The adaptive soft head loading is achieved by adapting a characteristic of the disk drive head loading operation, preferably an electrical signal, to correspond to the individual load characteristic of a particular disk drive. More preferably, the pulse width of an electrical signal is adaptive in an increasing and a decreasing value, such that the pulse width is a minimal pulse width required to move the heads into soft engagement with the medium. More preferably, the pulse width is adapted between at least two different pulse width points. Preferably, one of the pulse width points approaches, without exceeding a pulse width upper limit, which corresponds to a head loading velocity limit. The other pulse width point preferably approaches without falling below a pulse width lower limit. This adaptive soft head loading substantially ensures successful head load, while at the same time allows the head to be loaded into engagement with the medium at a safe velocity, thereby reducing the potential for damage to the head, the medium, or both.

BRIEF DESCRIPTION OF THE DRAWINGS

The foregoing summary, as well as the following detailed description of the preferred embodiments, are better understood when they are read in conjunction with the appended drawings. The drawings illustrate preferred embodiments of the invention to illustrate aspects of the invention. However, the invention should not be considered to be limited to the specific embodiments that are illustrated and disclosed. In the drawings:

FIGS. 8A, 8B, and 8C show the movement of the head arm assembly on to and off of the load ramp for the exemplary drive of FIGS. 1 and 4;

FIG. 11A is a graph of an exemplary adaptive soft head loading waveform of the present invention for use with the disk drive of FIG. 1;

FIG. 11B is a graph showing various pulse widths for the adaptive waveform of FIG. 11A.

DETAILED DESCRIPTION OF PREFERRED EMBODIMENTS

The invention provides an adaptive soft head loading apparatus and method for a disk drive. Throughout the description, the invention is described in connection with a removable media disk drive, and the drive is shown having a linear actuator. However, the particular disk drive and cartridge shown only illustrate the operation of the present invention and are not intended as limitations. The invention is equally applicable to other disk drives including rotary actuator disk drives, fixed medium drives, and removable medium disk drives that accept differently sized and shaped cartridges. Accordingly, the invention should not be limited to the particular drive or cartridge embodiment shown, as the invention contemplates the application to other drive and cartridge types and configurations.

Figure 1:
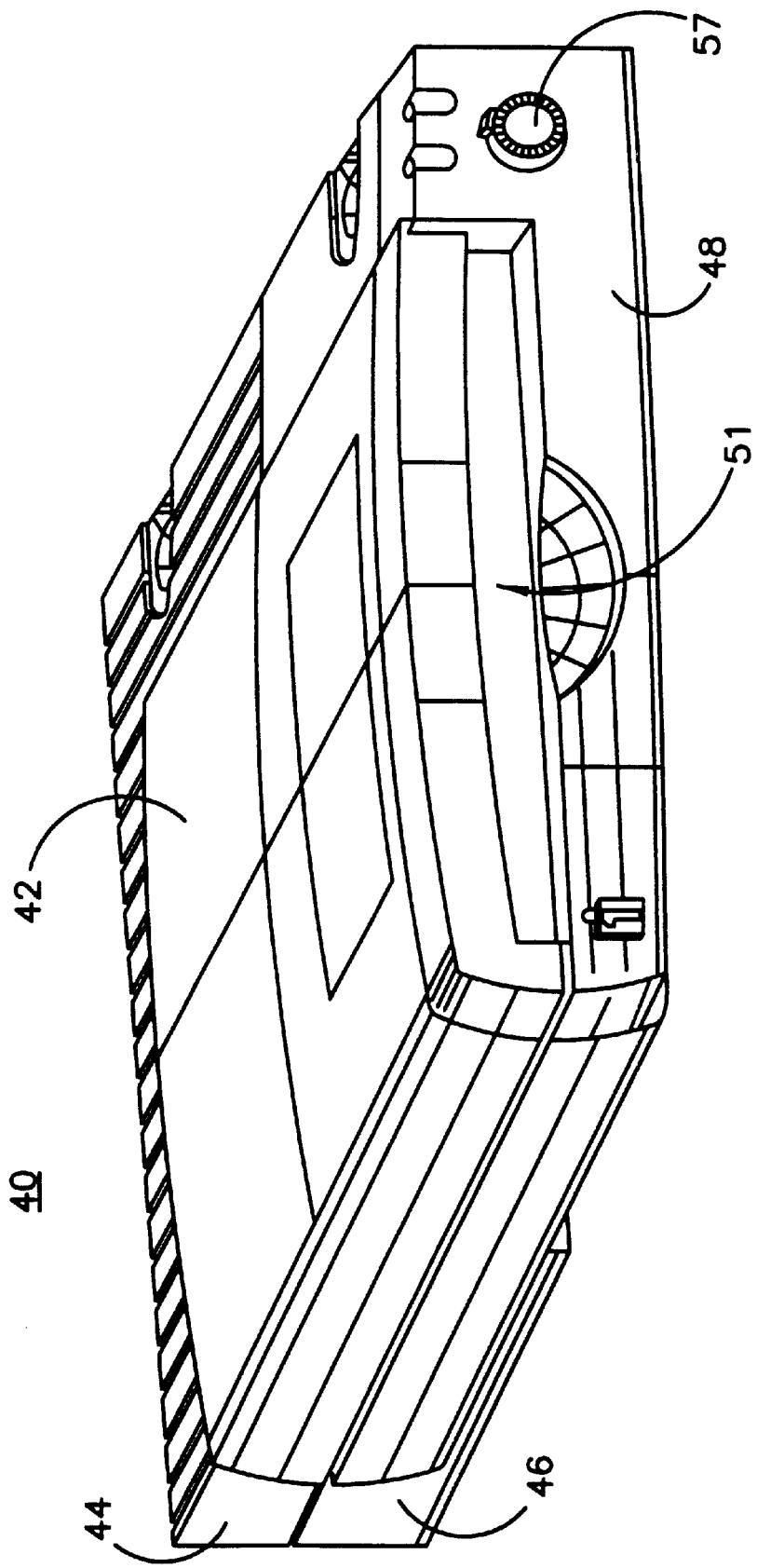
FIG. 1 is a perspective view of an exemplary data storage device, or disk drive, in which the present invention is embodied.

Referring to the drawings wherein like numerals indicate like elements throughout, there is shown in FIG. 1 a data storage device, or disk drive 40, in which the present invention is embodied. As shown, the disk drive 40 comprises an outer housing 42 having top and bottom covers 44, 46 and a front panel 48. A disk cartridge can be inserted into the disk drive 40 through a horizontal opening 51 in the front panel 48 of the disk drive 40. An eject button 57 is also provided on the front panel for automatically ejecting a disk cartridge from the disk drive 40. The disk drive 40 can be employed as a stand-alone unit, or alternatively, can be employed as an internal disk drive of a computer (not shown).

Figure 2:
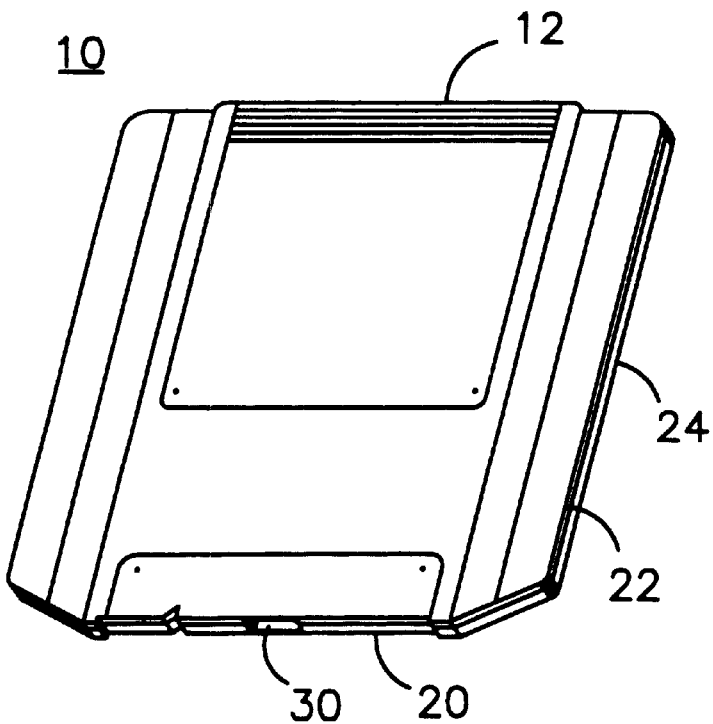
FIG. 2 is a perspective view of an exemplary disk cartridge for use with the disk drive of the FIG. 1.
Figure 3:
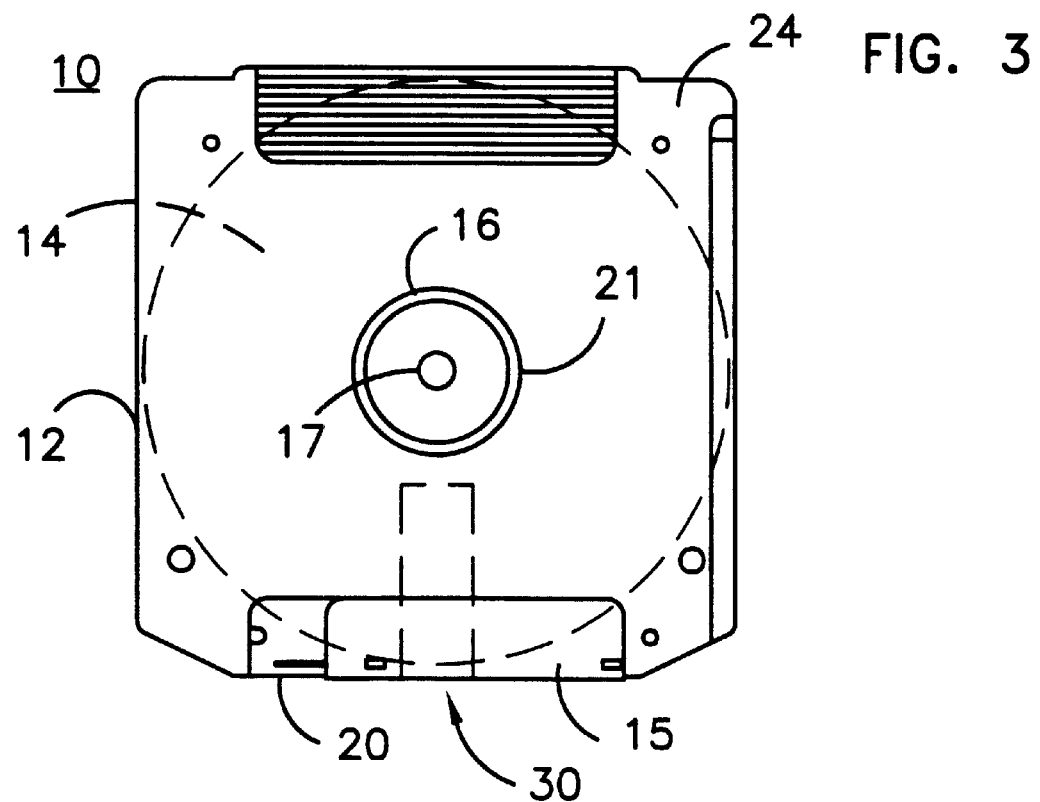
FIG. 3 is a bottom view of the disk cartridge of FIG. 2.

FIGS. 2 and 3 show an exemplary disk cartridge 10 adapted for use in the disk drive 40 of FIG. 1. As shown, the disk cartridge 10 comprises an outer casing 12 having upper and lower shells 22, 24 that mate to form the casing. A disk-shaped recording medium 14 is affixed to a hub 16 that is rotatably mounted in the casing 12. An opening 21 on the bottom shell 24 of the casing 12 provides access to the disk hub 16. A head access opening 30 in the front peripheral edge 20 of the disk cartridge 10 provides access to the recording surfaces of the disk 14 by the recording heads 18, 19 of the disk drive 40. A shutter 15 (not shown in FIG. 2) is provided on the front peripheral edge 20 of the disk cartridge 10 to cover the head access opening 30 when the cartridge is not in use. When the cartridge is inserted into the disk drive, the shutter 15 moves to the side exposing the head access opening 30 and thereby providing the heads of the drive with access to the recording surface of the disk 14. In the present embodiment, the casing houses a flexible or floppy magnetic disk, however, in other embodiments, the disk may comprise a rigid magnetic disk, a magneto-optical disk, an optical storage medium, or other type of cartridge-less medium.

Figure 4:
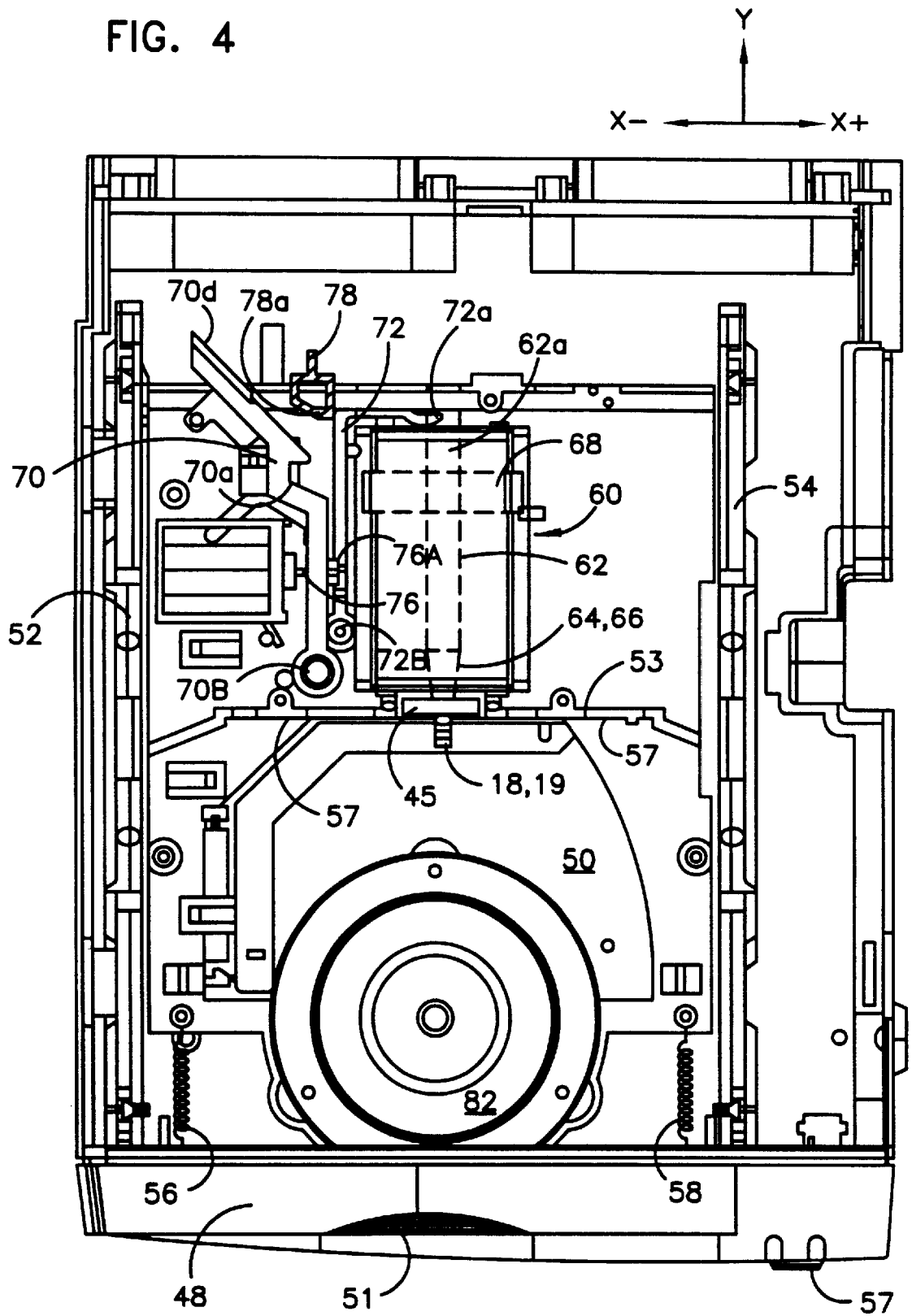
FIG. 4 is a top view of the data storage device of FIG. 3 with a top cover of the device housing removed.
Figure 7:
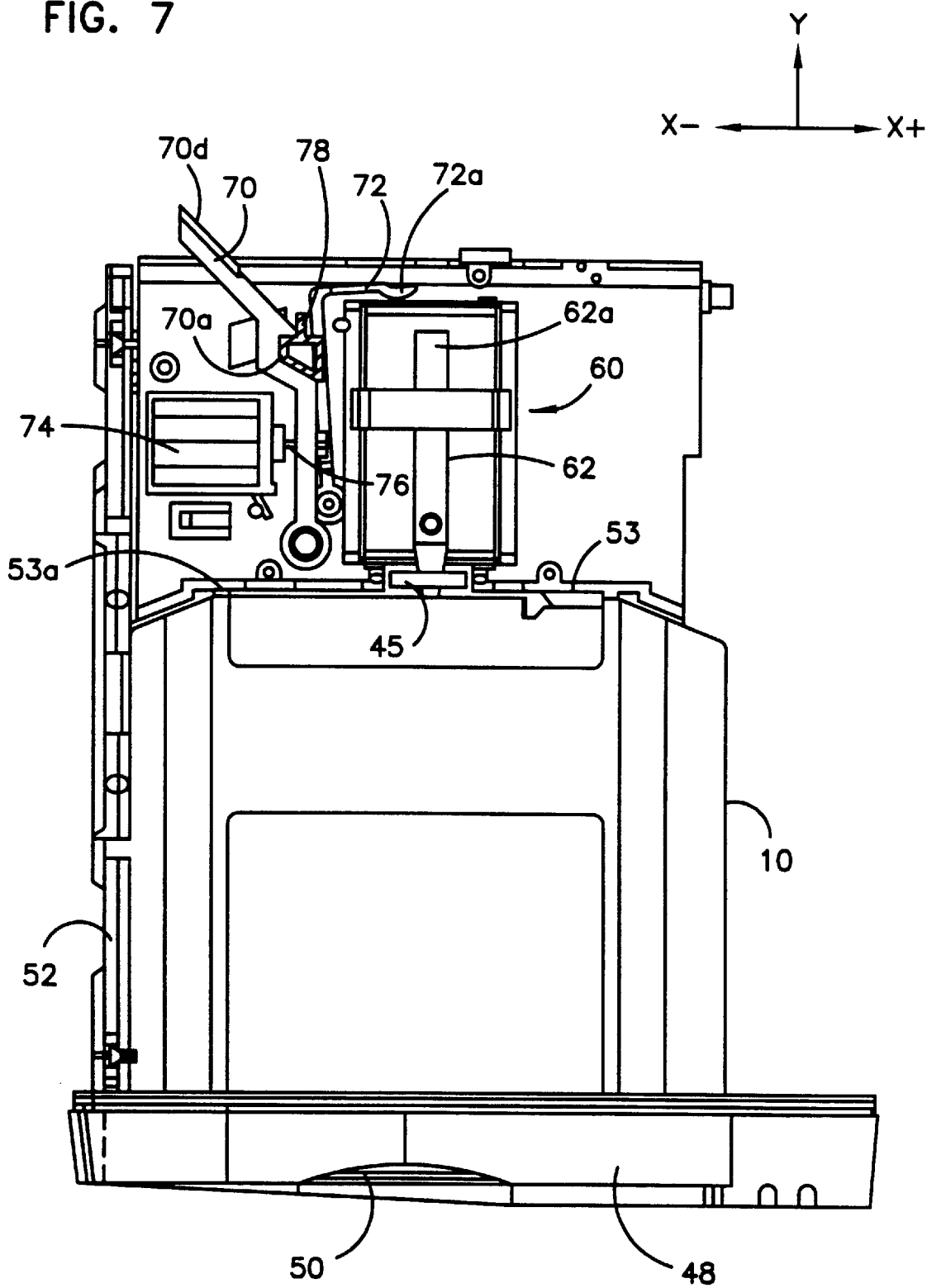

FIG. 4 is a top view of the disk drive 40 of FIG. 1 with the top cover 44 removed. The disk drive 40 comprises an internal platform 50 that slides along opposing side rails 52, 54 between a forward position (as shown in FIG. 4) and a rearward position (as shown in FIG. 7). A pair of springs 56, 58 bias the platform 50 toward its forward position.

An actuator 60, which in the preferred embodiment comprises a linear actuator, is mounted to the rear of the platform 50. The linear actuator 60 comprises a carriage assembly 62 (also referred to herein as head arm assembly) having two lightweight flexible arms 64, 66. The recording heads 18, 19 of the disk drive are mounted at the ends of the respective arms 64, 66. A coil 68, which is part of a voice coil motor, is mounted at the opposite end of the carriage 62. The coil 68 interacts with magnets (not shown) to move the carriage linearly so that the heads 18 and 19 can move radially over respective recording surfaces of a disk cartridge inserted into the disk drive. Additional details of the linear actuator 60 are provided in PCT application WO 96/12274, published Apr. 25, 1996, entitled "Actuator for Data Storage Device", which is incorporated herein by reference.

A raised wall 53 is formed on the platform. The raised wall 53 extends across the width of the platform 50, perpendicularly to the direction of motion of the carriage 62. The raised wall 53 defines an eject member that engages the front peripheral edge 20 of the disk cartridge 10 upon insertion of the disk cartridge into the disk drive. Preferably, the shape of the eject member 57 mirrors the contour of the forward end face of the cartridge.

The disk drive 40 further comprises a spindle motor 82 capable of rotating the recording medium of a disk cartridge at a predetermined operating speed. In the present embodiment, the spindle motor 82 is coupled to the platform 50. As described hereinafter, when a disk cartridge is inserted into the disk drive, the hub 16 of the disk cartridge engages the spindle motor 82 of the disk drive 40 when the platform reaches its rearward position.

Figure 5:
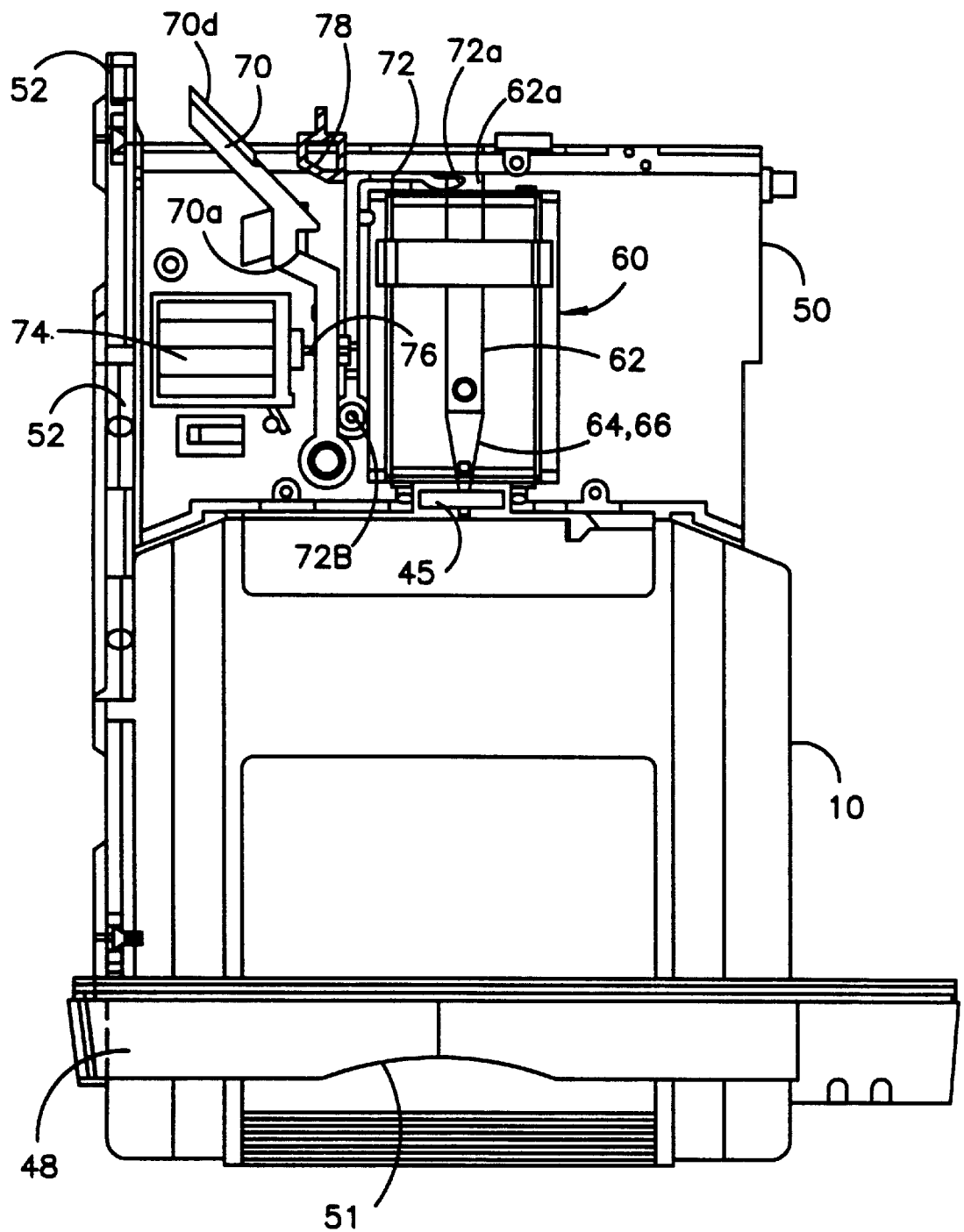
FIGS. 5–7 are top views of the data storage device of FIG. 4 illustrating the insertion of a disk cartridge into the device.
Figure 6:
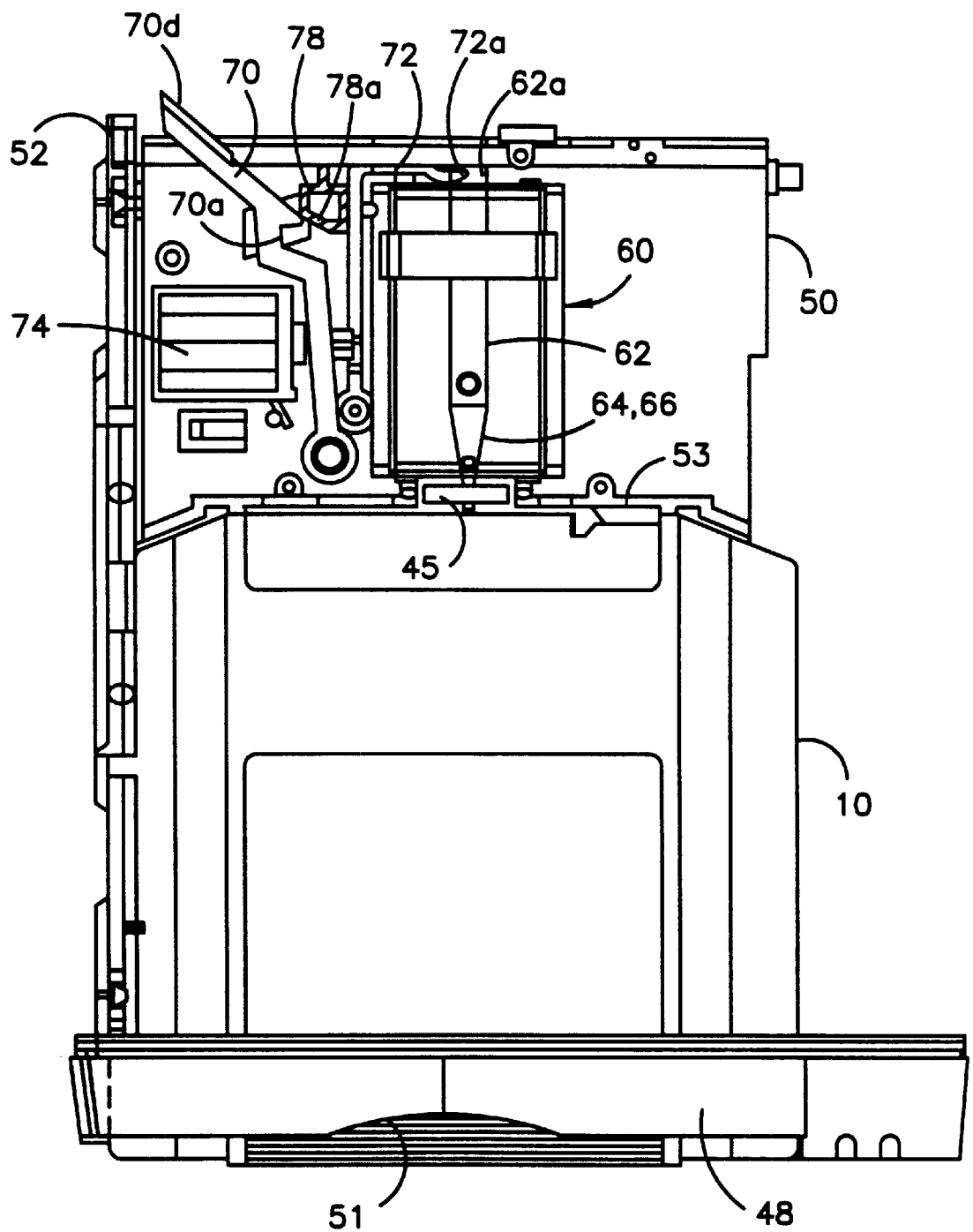

FIGS. 5–7 illustrate the insertion of a disk cartridge 10 into the disk drive 40. For purposes of illustration only, some components of the disk drive 40 are not shown. Referring to FIG. 5, a disk cartridge 10 is inserted into the disk drive 40 through the opening 51 in the front panel 48 of the disk drive 40. Initially, the platform 50 is in its forward position, as shown. As the disk cartridge 10 is pushed farther into the disk drive 40, the forward end 20 of the cartridge 10 engages the corresponding front surface of the eject member 57 of the platform 50. Thereafter, the disk cartridge 10 and platform 50, including the eject member 57, move together rearwardly against the biasing force of the springs 56, 58 (FIG. 4).

The platform 50 rides in slots (not shown) along the opposing side rails 52, 54. The slots (not shown) in the opposing side rails 52, 54 are contoured such that, as the platform 50 and disk cartridge 10 move rearwardly, the elevation of the platform 50 changes. Specifically, the platform 50 rises in order to bring the spindle motor 82 of the disk drive 40 into engagement with the hub 16 of the disk cartridge 10. Engagement of the hub 16 and spindle motor 82 is completed when the platform 50 reaches its final rearward position (FIG. 7).

Referring to FIG. 6, as the platform 50 approaches its rearward position, the portion of the eject latch lever 70 just rearward of the cutout 70*a* contacts an angled surface 78*a* of the latch projection 78. As the disk cartridge 10 pushes the platform 50 farther to the rear of the disk drive, the eject latch lever 70 rides along the angled surface 78*a* pushing the eject latch lever 70 to the side (i.e., X⁻ direction) against its normal spring bias. As shown in FIG. 7, when the platform reaches its full rearward position, the eject latch lever 70 springs back in the X⁺ direction such that the cutout 70*a* engages the latch projection 78. This latches the platform 50, and hence the eject member 57, in its rearward position and maintains the disk cartridge 10 in the disk drive 40. In this manner, the eject latch lever is said to be self-latching.

It is understood that in other embodiments, the eject member 57 may be formed separately from the platform 50 and the platform 50 may be stationary. In such embodiments, the eject member 57 alone will move from the forward position to the rearward position, and the eject latch lever 70 will be adapted to latch the eject member 57 in its rearward position. In still other embodiments, the platform 50 may be omitted. The present invention, as defined by the appended claims, is intended to cover all such embodiments.

When the disk cartridge 10 is inserted into disk drive device 40, flexible disk medium 14 couples with chuck platform 50 which is provided on spindle motor 82 and accordingly rotates together with the rotation of spindle motor 82. Head arm assembly 62 retracts to a parked position off of the medium 14 during insertion or ejection of disk cartridge 10. Preferably, head arm assembly 62 loads read-write heads 18, 19 (i.e., moves them from the parked position onto flexible disk 14) after cartridge 10 is inserted and disk medium 14 is rotating at an operational speed.

FIGS. 8A, 8B, and 8C illustrate the movement of head arm assembly 62 on and off of load ramp 47 between a first, parked position, and a second, loaded position for an exemplary drive and disk cartridge having a linear actuator. Load ramp 47 is shown as part of a load/unload device 45 for exemplary purposes only as the invention is equally applicable to a variety of load ramp designs. For example, the present invention also contemplates locating the load ramp 47 in other locations within the drive 40 or in locating the head loading/unloading ramps 47 within the cartridge 10 to guide the opposing read/write heads 18, 19 onto and away from the respective, opposite surfaces of the storage medium (not shown) during head loading and unloading operations. In the present embodiment, the head loading/unloading ramps comprise first and second opposed ramps 34 and 36, respectively.

As shown, FIGS. 8A, 8B, and 8C provide an exemplary illustration of the movement of head arm assembly 62 on and off of a load ramp 47 between a first, parked position and a second, loaded position for an exemplary drive having a linear actuator. FIG. 8A shows a perspective view of the head arm assembly 62 in the parked position on load ramp 47 and provides further details of load ramp 47. The wing members 61, 63 of suspension arms 64, 66 slide up the ramp surface 34. FIG. 8B shows a perspective view of the head arm assembly 62 on the load ramp in a position that is between the parked position and the loaded position. The wing members 61, 63 then slide down ramp surface 36 onto a medium surface. FIG. 8C shows a perspective view of the head arm assembly 62 in a loaded position, wherein the head arm assembly 62 is free to move read-write heads 18, 19 over the surface of a disk medium 14.

As further shown in FIGS. 8A, 8B, and 8C, the first and second suspension arms 64, 66 of the exemplary linear actuator have respective wing members 61, 63 attached thereto, which in the preferred embodiment, comprise elongate rods. It is understood, however, that the wing members 61, 63 could take any form and are by no means limited to the elongate rod structures shown. As described below, these wing members 61, 63 ride on the first and second opposed ramps 34, 36 of the present invention in order to guide the read/write heads 18, 19 onto and away from the respective surfaces of the storage medium 14 during head loading and unloading operations.

In use, as the read/write heads 18, 19 of the linear actuator 60 enter the head access opening 30 (as shown in FIGS. 5 through 7) and approach the edge of the storage medium (not shown), the wing members 61, 63 on the respective suspension arms 64, 66 ride up the first opposed ramps 34, causing the heads 18, 19 to separate so that they can pass on both sides of the storage medium 14. Further travel of the suspension arms 64, 66 causes the wing members 61, 63 to ride down the second opposed ramps 36, bringing the heads 18, 19 onto the respective surfaces of the storage medium 14.

Upon withdrawal of the suspension arms 64, 66 from the disk cartridge, the wing members 61, 63 ride back up the second opposed ramps 36 to again separate the heads 18, 19. Further retraction of the suspension arms 64, 66 moves the heads 18, 19 away from the storage medium 14 and back down the first opposed ramps 34. As the wing members 61, 63 ride down the first opposed ramps 34 and begin to move back out of the disk cartridge 10 to a parked position.

In a preferred embodiment, the first and second opposing ramps are defined by first and second ramp members 38, 41 that are disposed near the head access opening 30 of the disk cartridge on opposite sides of the load/unload device 45. Each ramp member 38, 41 has an upper portion 38*a*, 41*a* and a lower portion 38*b*, 41*b* separated by a respective spacing 37, 39. The respective spacings 37, 39 receive the outer edge of the rotating storage medium (not shown).

The read/write heads 18, 19 pass through the space between the respective ramp members 38, 41, while the wing members 61, 63 ride over the respective ramped surfaces 34, 36. The ramp members 38, 41 can be formed separately from the drive and then coupled to the inside of the bottom cover 46 or top cover 44. Alternatively, the first and second ramp members 38, 41 can be formed integrally with either the top or bottom cover 44,46 of drive 40. In the present embodiment, the ramp members 38, 41 are formed of plastic, although any suitable material can be employed. In an alternative embodiment, a single ramp member can be employed on only one side of the drive 40. However, two ramp members 38, 41 are preferable to add stability to the head loading/unloading operation.

As the foregoing illustrates, the present invention is directed to a disk cartridge having head loading/unloading ramps disposed within the drive 40. It is understood that changes may be made to the embodiments described above without departing from the broad inventive concepts thereof. For example, the invention also contemplates embodiments where the head mounting ramp are disposed in the disk cartridge 10. Also, while the present invention is disclosed above in connection with a linear actuator mechanism, the present invention could also be employed in connection with a radial arm actuator. Accordingly, the present invention is not limited to the particular embodiments disclosed, but is intended to cover all modifications that are within the spirit and scope of the invention as defined by the appended claims.

Figure 9:
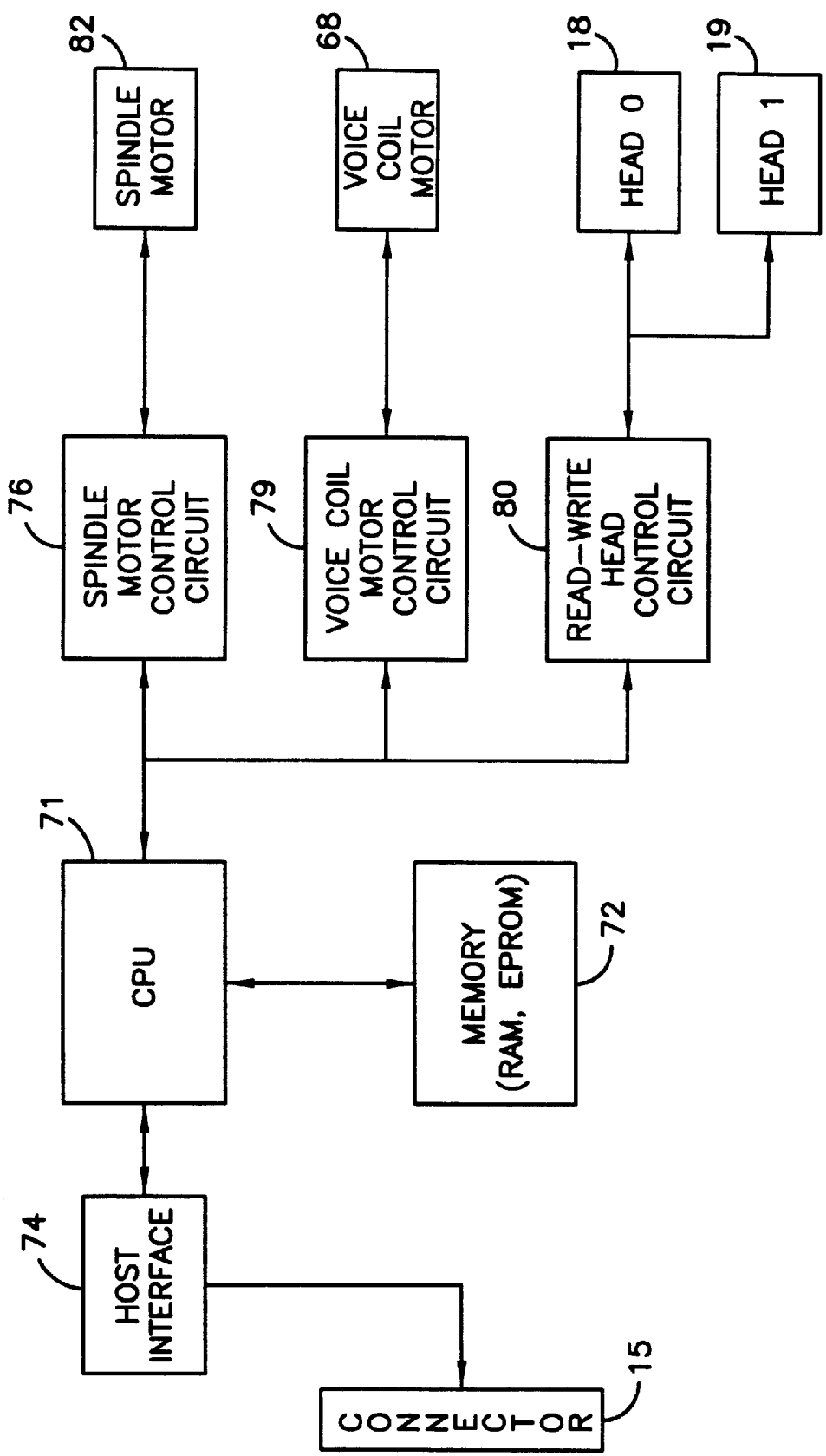
FIG. 9 is a block diagram of an exemplary electronics system of the disk drive of FIG. 1.

FIG. 9 is a block diagram of an exemplary electronics system of drive 40. The electronics system controls the movement of head arm assembly 62 via voice coil motor 68, the reading and writing to medium 14 via heads 18, 19, and the spinning of the flexible medium to an operational speed via spindle motor 82. The electronics system comprises a main CPU 71, memory 72, a host interface 74, a spindle motor control circuit 76, a voice coil motor control circuit 79, and a read-write head control circuit 80. Memory 72 contains a set of programs and data that control various operations of the electronics system. In particular, memory 72 contains programs for controlling the operation of head loading and head parking from medium 14. The head loading and parking programs, as well as other programs vital to the operation of drive 40 stored in memory 72, are executed on CPU 71, which in turn uses the programs to control and monitor the operation of the various electronic subsystems components, i.e., control circuits 76, 79, and 80. As described more fully below, the subsystem components directly control electro-mechanical drive components.

Spindle motor control circuit 76 is electrically coupled to spindle motor 82. As such, control circuit 76 controls the power to spindle motor 82 as needed to maintain the proper rotational speed. Voice coil motor control circuit 78 is electrically coupled to voice coil motor 68. By providing voltage and current to voice coil motor 68, control circuit 79 controls, head loading, head parking, and the movement of head arm assembly 62 over medium 14. Read-write head control circuit 80 controls the operation of heads 18, 19. By supplying a voltage signal to heads 18, 19 data is written to medium 14. By reading the voltage from heads 18, 19 data is read from medium 14.

During head loading and head parking, all of the components of the electronics system cooperate to ensure a proper operation. Preferably, medium 14 spins at the proper rate via spindle motor control 76; voice coil 68 moves the head arm assembly 62 between the parked position and medium 14; and read-write control circuit 80 provides location data about the head arm assembly 62. That is, disk drive servo systems typically use embedded position feedback in their voice coil motor servo loop. Hence, the read-write heads read servo sectors magnetically embedded in the medium surface. The servo sectors provide position information to the drive so that a track location on the medium can be determined. The position of the heads 18, 19 on the medium 14 may also be determined or tracked by a data point in or on the medium, the track number, or the grey code.

During head loading from a load ramp, such as load ramp 47, before the heads have reached the medium surface no positioning information is available. Accordingly, the position of the heads along the ramp cannot be determined without an additional sensor. Once the heads are loaded onto the medium, the heads will emit a signal indicative of the signals on the medium surface, such as servo sector information. Hence, the heads are monitored during loading for a signal from the medium surface to indicate that the heads have loaded. The head load velocity of the heads over the medium may be measured by reading a first position of the heads over the medium, then reading a second position of the heads over the medium. The head load velocity may then be calculated by subtracting the first position from the second position, and then dividing this result by the time differential between the two readings.

In the exemplary disk drive 40 as described herein, during head loading, head arm assembly 62 overcomes the friction and stiction of load ramp 47 before moving into position on medium 14. To that end, the friction of suspension arms 64, 66 (or more specifically, wing members 61, 63) against the ramp 47 surface, is overcome (see FIG. 8). To overcome the friction, a high current is typically applied to voice coil motor 68. The downside to applying a high current is that heads 18, 19 could move off of load ramp 47 too fast and thereby damage the heads, the surface of medium, or both. Moreover, where, as here, it is desirable to minimize power consumption, the peak power consumed during head loading may be high. A process for dealing with the velocity of the head loading and the peak power is described below.

Figure 10:
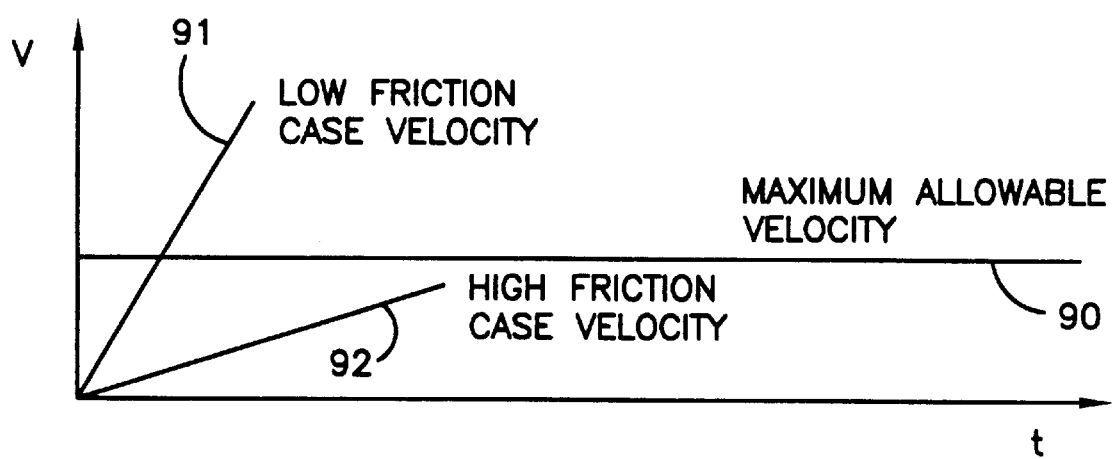
FIG. 10 is a graph of head velocity for a constant power head load.

The problem of heads 18, 19 loading too fast from load ramp 47 is illustrated by the graph of FIG. 10. That graph illustrates head loading where a constant current is applied to voice coil motor 68 for a set time period during loading. FIG. 10 illustrates the velocity of heads 18, 19 as they load onto medium 14 after an electrical signal is applied to voice coil motor 68. This graph plots velocity (V) along the ordinate and plots time (t) along the abscissa.

By contrast, the problems associated with the heads loading too fast are mitigated by applying an adaptive electrical signal, such as voltage or current, during the head loading procedure. The adaptive soft head loading of the present invention adapts either the time period that a constant electrical signal, such as current or voltage, is applied, or adapts the amplitude of the electrical signal that is applied to voice coil motor 68 for a constant period of time. Preferably, the adaptive soft head loading is accomplished by adapting the time period during which a constant predetermined current is applied to the voice coil motor 68. However, as stated above, adaptively controlling the amplitude of the current and/or voltage could also implement adaptive head loading.

Referring to FIG. 10, shown are two velocity curves 91, 92 for disk drives wherein a constant voice coil motor current or voltage is applied. Level 90 represents the maximum allowable velocity for heads 18, 19 (hereinafter also referred to as maximum velocity limit). That is, if head velocity exceeds level 90 over a period of time, then the likelihood of damage to the heads 18, 19, the medium 14, or both is increased. Curve 91 represents a worst case drive in which the load ramps present very little friction. In such a case, the heads accelerate off of the load ramps and exceed the maximum velocity level. On the other hand, in a drive with very high friction, as represented by curve 92, the heads accelerate slowly and do not exceed maximum velocity level 90 before loading on the medium. Unfortunately, for some disk drive designs, such as drive 40, the head loading friction may vary between the friction represented by curve 91 and the friction represented by curve 92. As a result, applying a constant head loading voltage to voice coil motor 68 will often result in damage to some drives.

An exemplary adaptive soft head load waveform is illustrated by the graph of FIG. 11A. Here, an adaptive electrical signal, such as voltage or preferably current, is applied to voice coil motor 68 for a time $t_1$. Thereafter, the current or voltage to voice coil motor 68 is turned off for a period $t_2$. It is then determined whether the head load was successful or whether the head load velocity was to high. If the head load was not successful, a characteristic of the electrical signal waveform is adapted to improve the likelihood of a successful head load on a subsequent attempt to load the head. Preferably the pulse width of the electrical signal is adjusted to either increase or decrease the duration of the current output for the subsequent head load operation. Once a successful head load is detected, a braking current is applied, for a time period represented by $t_3$, to the actuator voice coil motor 68 to stop the motion of the heads 18, 19 over the medium 14.

FIG. 11B shows a pulse width 95 that is preferably set to a nominal pulse width to start. The pulse width 95 is adaptive between two points. The first pulse width point 96a corresponds to a pulse width upper limit and the second pulse width point 96b corresponds to a pulse width lower limit. The pulse width 95 is adaptive within the range of the pulse width upper limit and the pulse width lower limit. The pulse width is also adaptive to a third point. This third point is a maximum pulse width 97. Once the pulse width is increased to the pulse width upper limit 96a, the subsequent increase is preferably made to the maximum pulse width. This increase to the maximum pulse width 97 is made to substantially ensure the head load onto the medium 14, while at the same time reducing the number of retries that the drive 40 makes in attempting the load the heads 18, 19. For example, in one currently preferred embodiment, the maximum pulse width has a value of about 24 msec, the pulse width upper limit has a value of about 17.5 msec, the nominal pulse width has a value of about 13 msec, and the pulse width lower limit has a value of about 8.5 msec. The pulse width may be adapted in a variety of increments, but the value of the increments is preferably a predetermined increment that is selected to limit the number of retries, in attempting to load the heads, to an acceptable amount of time. In the above example, the pulse width is preferably adapted, either increasing or decreasing, in increments of about 1.5 msec. The above example is provided as an illustration of one currently preferred embodiment only, and the present invention is not limited to the particular embodiment disclosed and the values given.

Referring to back to FIG. 11A, $t_1$ represents the time during which current or voltage applied to the actuator voice coil 68 is positive in an attempt to load the heads 18, 19 onto the medium 14. This is the time that is preferably adaptive by the present invention to provide an adaptive soft head loading. The period shown as $t_2$ represents the time during which no current or voltage is output to the actuator 60. This portion of the head load operation lasts until either the drive 40 detects that the heads 18, 19 have successfully come into engagement with the medium 14, i.e., heads 18, 19 successfully loaded, or a specified time allowed for head loading has passed, i.e., heads 18, 19 did not successfully load. The period shown as $t_3$ represents the time period during which a braking current or voltage is output to the actuator 60. This portion lasts until the heads have been brought to zero velocity.

The result is that curve 91 is adaptive by measuring a head load velocity and then adjusting a load characteristic of the drive, preferably the pulse width 95 of the current or voltage to the voice motor coil 68 so the head load velocity is adaptive for a soft head load of the heads 18, 19 onto the medium 14. As a result, the head load velocity will not reaches level 90 during the application of the electrical signal to the voice coil motor 68 for subsequent head loads. Instead, the head load velocity is measured and the applied electrical signal is adjusted so that the curve 91 reaches an acceptable velocity level 90 when the heads 18, 19 come into contact with the medium 14.

Figure 12:
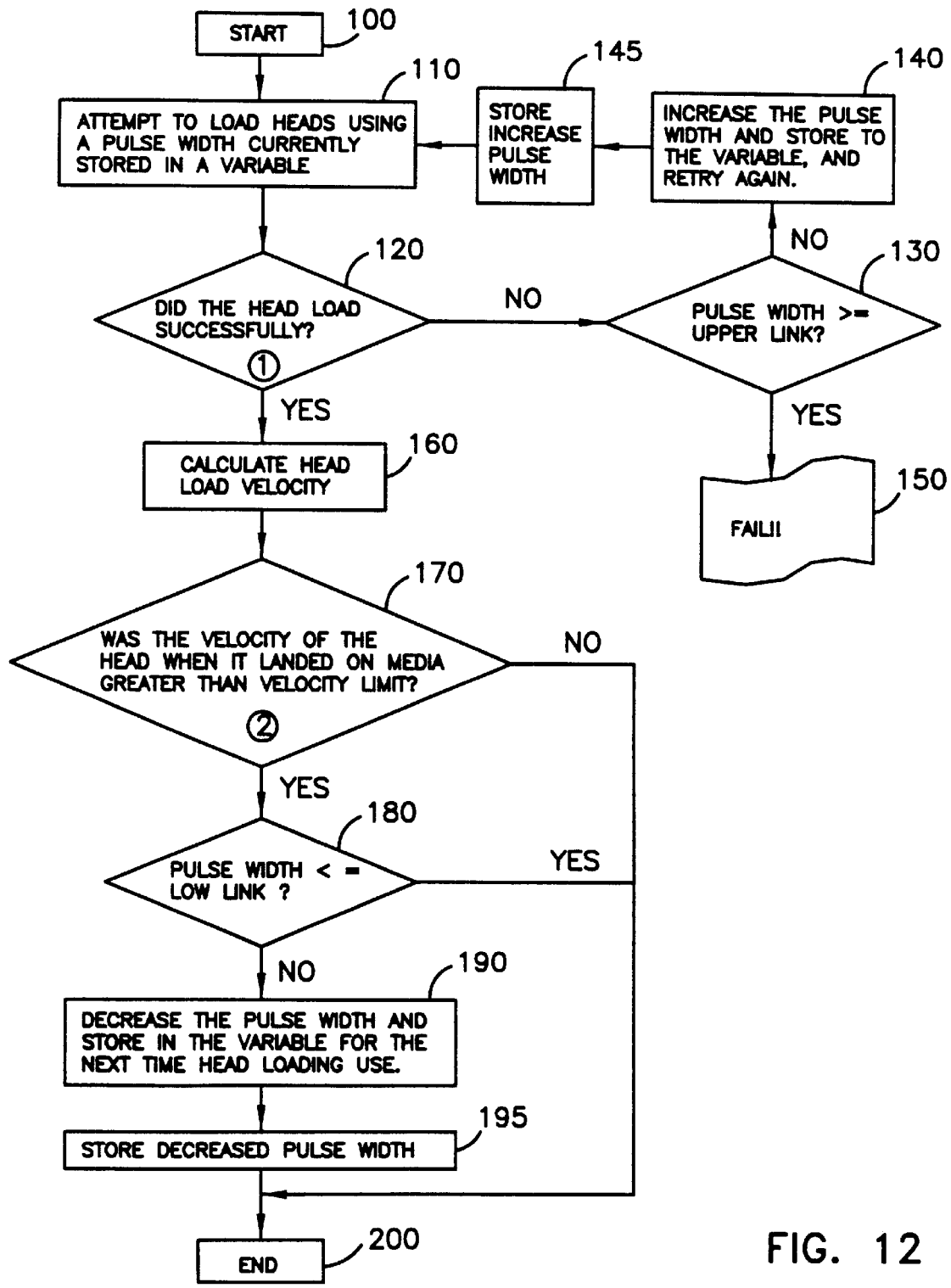
FIG. 12 is a flow chart of an exemplary process for adaptive soft head loading of the present invention.

FIG. 12 provides a flow chart of an exemplary head loading process as executed in accordance with the present invention; i.e., in CPU 71 of FIG. 9. In step 100, a disk drive 40 and a disk 10 having a medium 14 are provided. Accordingly, throughout the description reference is made to both the mechanical aspects of drive 40 (as shown in FIGS. 1 and 4) and the electrical system aspects of drive 40 (as illustrated in the block diagram of FIG. 9).

As shown in FIG. 12, the loading process begins when current or voltage is applied to voice coil motor 68 (VCM) (step 110). The pulse width applied to the actuator coil corresponds to the value of the currently stored pulse width that is stored in the firmware of the drive (not shown). The current or voltage to the coil 68 is only turned on for a certain length of time after which the current or voltage is turned off and the heads 18,19 are allowed to coast onto the media. For instances where the drive is being activated for the first time or where no value is currently stored, a predetermined nominal pulse width is used. This nominal pulse width is preferably stored in the computer firmware. The pulse width corresponds to the time $t_1$ in FIG. 11A. As a result, an attempt is made to move head arm assembly 62 from a parked position, onto the load ramp 47, and toward medium 14.

In order to determine if heads 18, 19 have landed on medium 14, heads 18, 19 are read at step 120 to determine if a signal from the surface of medium 14 is present. To that end, heads 18, 19 attempt to acquire a data point, a servo sector, or a track number (step 120). Preferably the velocity of the heads after they come into contact with the medium are measured by looking at the grey codes at two successive servo samples to determine the distance (in tracks) that the heads traveled in one servo sample. Of course, the heads 18, 19 will only be able to read the medium 14 if the heads 18, 19 were successfully loaded on medium 14. Hence, if a the medium 14 is detected, then heads 18, 19 were successfully loaded onto medium 14 (step 120). On the other hand, if no head load is detected, then the pulse width is adjusted by increasing the pulse width, and the head load is re-attempted until a successful head load is achieved or until the pulse width reaches an pulse width upper limit 96a.

If the head load velocity is greater than a predetermined velocity limit, then the length of time that the current or voltage is turned on for during loading the heads onto the medium is decreased (down to some predetermined lower limit). Also, if the heads do not successfully load, the time that the current or voltage is turned on for is increased (up to some predetermined upper limit). The length of time that the current or voltage is turned on is preferably stored in a variable in the microcode. When the length of time (or pulse width) of the current or voltage is adjusted, the increased or decreased value is preferably stored to the variable in the microcode in place of the previously stored value.

When the process of FIG. 12 is completed, heads 18, 19 will have been successfully loaded onto medium 14 (as shown in step 200) or a problem likely exists with the drive 40 and the head load fails (as shown in step 150). Heads 18, 19 are soft loaded onto the medium 14 by adjusting the loading of the heads in relation to a measured head load velocity so that the adaptive soft loading will softly land the heads 18, 19 onto medium 14 without causing damage to either heads 18, 19 or medium 14.

A preferred embodiment would work like this. Referring to FIG. 12, a disk drive and medium are provided at step 100. An attempt is made to load the heads of the disk drive onto the surface of the medium. This attempt at step 110 is preferably made by applying an electrical pulse to a drive actuator of the drive to which the heads is connected. The electrical pulse has a pulse width corresponding to a pulse width currently stored in a variable of the system firmware. Preferably, a nominal pulse width is stored in the firmware of the drive as the default pulse width. Preferably the value of the nominal pulse width is predetermined based on the characteristics of a typical drive and the load parameter that is being adaptive, in order to substantially ensure a successful head load. This nominal pulse width is used whenever the drive is turned off and on.

As described above, it is then determined at step 120 whether the heads loaded successfully. Preferably, a successful heads load is determined if the servo mark and/or a grey code track in each servo field are successfully found.

If the head load was not successful, then the currently stored pulse width is compared at step 130 to a pulse width upper limit. If the currently stored pulse width is greater than or equal to the pulse width upper limit, then the head load fails at step 150 and no further attempts are made to load the heads.

If the currently stored pulse width is not greater than or equal to the pulse width upper limit, then the pulse width is increased at step 140, and the increased pulse width is stored at step 145 in the variable in place of the pulse width value previously stored. Preferably, the pulse width is increased in predetermined increments. The size of the increments is selected to substantially ensure a successful head load and to reduce the number of retries, while at the same time attempting to minimize the resulting head load velocity. Another attempt is then made to load the heads onto the medium back at step 110. This is repeated until the heads are successfully loaded onto the medium at step 160 or until the head load fails at step 150.

If the head load was successful, then the velocity of the heads when they landed on the medium is determined at step 160. Preferably, the velocity of the heads when it lands on the medium is determined by reading a first grey code track when the heads first land on the medium, then reading a second grey code track after a known time differential. The first grey code track is then subtracted from the second grey code track and this result is then divided by the time differential to obtain the velocity of the heads during the load operation. If the measured load velocity when the heads landed on the medium is not greater than a predetermined velocity limit, then the head load operation ends at step 200.

If the head load velocity when the heads landed on the medium is greater than a predetermined velocity limit, then the currently stored pulse width is compared to a pulse width lower limit at step 170. If the currently stored pulse width is less than or equal to the pulse width lower limit, then the head load operation ends at step 200.

If the currently stored pulse width is not less than or equal to the pulse width lower limit, then the pulse width is decreased at step 190 and the decreased pulse width is stored at step 195 in the variable in place of the previously stored pulse width. The head load operation ends at step 200. This decreased pulse width that is now stored in the variable is then used for the next head load operation.

As shown and described, the system and method for adaptive head loading of disk drive heads onto a disk medium preferably does not require any additional hardware. The existing hardware of the drive that is used to control the motion and the read/write functions of the heads and also be used to control the adaptive head load velocity.

The above description of preferred embodiments is not intended to impliedly limit the scope of protection of the following claims. Thus, for example, except where they are expressly so limited, the following claims are not limited to the use of adaptive pulse width shown and described herein.

What is claimed is:

1. A head loading apparatus for a disk drive device that reads data from and writes data to a magnetic medium, said head loading apparatus comprising:
    an actuator movably disposed within said disk drive;
    a read-write head in mechanical communication with said actuator, said actuator moving said head in response to an electrical signal;
    a head load ramp, for maintaining said read-write head in a parked position off of said medium;
    a control circuit in electrical communication with said actuator for moving said heads from said parked position to said medium by applying an adaptive electrical signal;
    said electrical signal being adaptive based on a measured head load velocity such that said heads move off of said load ramps toward said medium below a predetermined velocity;
    wherein said adaptive electrical signal further comprises a pulse having an adaptive pulse width adjustable increasingly and decreasingly between at least two pulse widths; and
    wherein said adaptive pulse width is stored by said disk drive, said stored pulse width being used to load said heads during subsequent head load operations.

2. The head loading apparatus as recited in claim 1 wherein said measured head load velocity is measured using existing drive hardware and firmware.

3. The head loading apparatus as recited in claim 1 wherein said measured head load velocity is measured using one of a data point, a track position, and a grey code.

4. The head loading apparatus as recited in claim 1 wherein said measured head load velocity is determined by measuring a head travel distance of said head over said medium during said head load operation.

5. The head loading apparatus as recited in claim 4 wherein said head travel distance is determined by reading a first head position and a second head position on said medium.

6. The head loading apparatus as recited in claim 5 wherein said first head position is measured by a first track number and said second track position is measured by a second track number.

7. The head loading apparatus as recited in claim 5 wherein said first head position is measured by a first data point in said medium and said second head position is measured by a second data point in said medium.

8. The head loading apparatus as recited in claim 1 wherein said signal comprises a current pulse, said current pulse having an adaptive pulse width adjustable increasingly and decreasingly between at least two pulse widths.

9. The head loading apparatus as recited in claim 1 wherein said pulse width is increased based on a high measured head load velocity.

10. The head loading apparatus as recited in claim 1 wherein said pulse width is decreased based on a low measured head load velocity.

11. The head loading apparatus as recited in claim 1 wherein said adaptive pulse width is adjusted increasingly or decreasingly based on said measured head load velocity.

12. The head loading apparatus as recited in claim 1 wherein said at least two pulse widths comprise a pulse width lower limit of about 8.5 msec.

13. The head loading apparatus as recited in claim 1 wherein said at least two pulse widths comprise a pulse width upper limit of about 17.5 msec.

14. The head loading apparatus as recited in claim 1 wherein said at least two pulse widths comprise a maximum pulse width of about 24 msec.

15. The head loading apparatus as recited in claim 1 wherein said actuator further comprises a voice coil motor and wherein said electrical signal is applied to said voice coil motor.

16. The head loading apparatus as recited in claim 1 wherein said magnetic medium comprises a removable media.

17. The head loading apparatus as recited in claim 16 wherein said medium comprises a floppy medium.

18. A head loading apparatus, comprising:

a load ramp;

a suspension arm having a read-write head coupled to a distal end of said suspension arm;

said suspension arm movable between a first position wherein said suspension arm is in a parked position and a second position wherein said suspension arm is disposed over a medium;

an actuator coupled to said suspension arm, for providing mechanical movement to said suspension arm; and a controller for controlling said movement of said actuator from said first position to said second position, said controller providing an adaptive electrical pulse to said actuator to cause said head to move from said first position toward said second position;

wherein a pulse width of said adaptive electrical pulse is adapted increasingly or decreasingly between at least two different pulse width points based on a measured movement of said actuator, said at least two different pulse width points comprising;

a first pulse width point corresponding to a pulse width upper limit;

a second pulse width point corresponding to a pulse width lower limit;

wherein said pulse width can be increased if said measured movement of said actuator is below said pulse width upper limit and said pulse width can be decreased if said measured movement of said actuator is above said pulse width lower limit.

19. The head loading apparatus as recited in claim 18 wherein said adaptive electrical pulse is adjusted increasingly and decreasingly based on a measured head load velocity.

20. The head loading apparatus as recited in claim 18 wherein said controller comprises means for adapting a pulse width of a current applied to said actuator.

21. The head loading apparatus as recited in claim 18 wherein said actuator comprises a voice coil motor and wherein said adaptive electrical pulse is applied to said voice coil motor.

22. The head loading apparatus as recited in claim 18 wherein said actuator comprises a linear actuator.

23. The head loading apparatus as recited in claim 18 further comprising a current source, said current source having a nominal pulse width.

24. The head loading apparatus as recited in claim 23 wherein said nominal pulse width is about 13 msec.

25. The head loading apparatus as recited in claim 23 wherein said nominal pulse width is adaptive increasingly and decreasingly, said pulse width having an upper pulse width limit of about 17.5 msec and a lower pulse width limit of about 8.5 msec.

26. The head loading apparatus as recited in claim 19 wherein said pulse comprises an on time and an off time, wherein said on time is selected such that the travel of said suspension arm from said first position toward said second position occurs below a predetermined velocity.

27. The head loading apparatus as recited in claim 18 wherein said pulses comprise an on time and an off time, wherein said on time is adjustable increasingly and decreasingly such that said travel of said suspension arm from said first position toward said second position does not exceed a predetermined velocity.

28. The head loading apparatus as recited in claim 18 further comprising a braking velocity to stop said travel of said heads over said medium.

29. The head loading apparatus as recited in claim 18 wherein said magnetic medium comprises a removable medium.

30. The head loading apparatus as recited in claim 29 wherein said medium comprises a floppy medium.

31. The head loading apparatus as recited in claim 18 wherein said adaptive electrical pulse is stored by said controller, wherein said controller uses said stored electrical pulse to move said actuator from said first position to said second position during subsequent head loading operations.

32. An adaptive head loading method for loading heads of a disk drive onto a data storage medium, comprising the steps of:

loading said heads into engagement with said medium;

measuring a head load velocity;

adjusting said loading based on said measured head load velocity;

increasing a pulse width of an adaptive electrical signal for loading said heads if said measured head load velocity is less than a pulse width upper limit; and decreasing said pulse width of said adaptive electrical signal if said measured head load velocity is greater than a pulse width lower limit.

33. The adaptive head loading method as recited in claim 32 wherein said step of loading further comprises the step of applying an adaptive electrical signal to an actuator coil and actuator assembly disposed in said drive, wherein said head is disposed on a distal end of said actuator, to move said actuator from a parked position in said drive to a second engagement position over said medium.

34. The adaptive head loading method as recited in claim 32 wherein said step of measuring further comprises the steps of:

reading a first position of said head over said medium using said head; and reading a second position of said head over said medium using said head.

35. The adaptive head loading method as recited in claim 32 wherein said step of measuring said head load velocity over said data storage medium further comprises verifying a servo mark and a grey code track in a servo field of said medium.

36. The adaptive head loading method as recited in claim 32 wherein said step of measuring said head load velocity further comprises the step of calculating said head load velocity, said step of calculating comprises the steps of:

reading a first grey code track;

reading a second grey code track;

measuring a time differential between said reading of said first grey code track and said reading of said second grey code track; and calculating a head load velocity by subtracting said first grey code track from said second grey code track, and dividing said result by said time differential.

37. The adaptive head loading method as recited in claim 32 further comprising the step of storing said adjusted electrical signal.

38. The adaptive head loading method as recited in claim 37 further comprising the step of using said stored adjusted electrical signal during a subsequent head load operation.

39. The adaptive head loading method as recited in claim 32 wherein said steps of loading, measuring, and adjusting are repeated until said heads are successfully loaded onto said medium or until a predetermined load condition occurs.

40. An adaptive head loading method for loading heads of a disk drive onto a data storage medium, comprising the steps of:

applying a voltage pulse to an actuator of said disk drive;

measuring a velocity of said head as it comes into engagement with said medium;

adapting said voltage pulse duration to a minimal level sufficient to substantially ensure movement of said head onto said medium, wherein said step of adapting said voltage pulse duration further comprises;

increasing said voltage pulse duration if said measured head load velocity is less than a pulse duration upper limit; and decreasing said voltage pulse duration if said measured head load velocity is greater than a pulse duration lower limit.

41. The adaptive head loading method of claim 40, further comprising the step of storing said adapted voltage pulse duration on said disk drive for subsequent head loading.

42. An adaptive head loading method for loading heads of a disk drive onto a data storage medium, comprising the steps of:

attempting to load said heads onto said data storage medium by applying an electrical pulse to an actuator, wherein said pulse has a predetermined pulse width;

determining whether said heads loaded successfully on said data storage medium;

if said heads did not load successfully, then comparing said pulse width to an upper pulse width to determine whether said pulse width is greater than or equal to a pulse width upper limit;

if said pulse width is greater than said pulse width upper limit, then stopping said application of said electrical pulse;

if said pulse width is less than said pulse width upper limit, then increasing said pulse width and storing said increased pulse width and attempting again to load said heads;

if said heads load successfully, determining ahead load velocity of said head when said head landed on said data storage medium, and comparing said head load velocity to a predetermined velocity limit;

if said head load velocity is less than said velocity limit, then stopping;

if said head load velocity is greater than said velocity limit, then comparing said currently stored pulse width to a pulse width lower limit;

if said pulse width is less than to said pulse width lower limit, then stopping;

if said pulse width is greater than said pulse width lower limit, then decreasing said pulse width and storing said decreased pulse width for a next head loading operation; and stopping.

* * * * *